Oct. 18, 1949.　　　R. W. THOMPSON　　　2,485,516
SHALLOW PLANE PROPORTIONAL COUNTER

Filed July 10, 1945　　　　　　　　　　　　　　4 Sheets-Sheet 1

WITNESSES
Ralph Carlisle Smith
Ralph G. Miller

INVENTOR.
Robert W. Thompson
BY
Robert A. Lavender

Oct. 18, 1949.  R. W. THOMPSON  2,485,516
SHALLOW PLANE PROPORTIONAL COUNTER
Filed July 10, 1945  4 Sheets-Sheet 2

WITNESSES
Ralph Carlisle Smith
Ralph G. Miller

INVENTOR.
Robert W. Thompson
BY

Patented Oct. 18, 1949

2,485,516

UNITED STATES PATENT OFFICE 2,485,516

SHALLOW PLANE PROPORTIONAL COUNTER

Robert W. Thompson, Minneapolis, Minn., assignor to the United States of America as represented by the United States Atomic Energy Commission Application July 10, 1945, Serial No. 604,276

4 Claims. (Cl. 250—83.6)

This invention relates generally to improvements in proportional counters.

While proportional counters are well known in the field of nuclear physics, many theoretical and experimental discussions relative to the operation thereof having been published to date, the phenomena which permit the determining of the magnitude of an ionizing event by measurement of the magnitude of pulse obtained from such a counter are still in a recognized state of speculation to the extent that quantitative theoretical agreement with empirically observed results does not presently exist.

Counters in which the pulse observed on the collecting electrode is proportional to the size of the initial ionizing event causing the counter to discharge date to at least 1928. Counters suitable for the detection of particles traversing the counter along the axis thereof and having paths at varying distances from the collecting electrode date to at least 1937.

The operation of proportional counters differs mainly from the operation of ion chambers by the magnitude of potential applied across the electrodes, since in an ion chamber the potential applied is sufficient to cause ion collection at the electrodes but insufficient to cause ionization by collision in space adjacent thereto, whereas in a proportional counter, a sufficient potential is applied to cause ionization by collision, and to thus obtain an output pulse which is greater than, but proportional to the ionization caused by the initial event.

While parallel plate proportional counters have been suggested, such devices heretofore proposed have been found to be inoperative or wholly unsatisfactory for their intended use.

It has been empirically determined that in proportional counters heretofore known in the art, having a cylindrical cathode and a wire-like anode, the size of the pulse obtained from a given ionizing event decreases with increase in distance of the event from the collecting electrode. It appears that the high fields existing even at appreciable distances from the collecting electrode in the known type of counter prevent appreciable recombination in the original column of ionization. The above mentioned variation in pulse size is believed to be due to substantially all electrons freed by an ionizing event in the immediate vicinity of the anode producing ions by collision, while a portion of the electrons released by a similar event at a greater distance from the anode become attached to larger particles to form negative ions prior to attaining the velocity at which ionization by collision takes place. The Thompson theory of negative ion formation supports empirically obtained data, since it is found that the probability of an electron becoming attached during sweep through a distance X increases with the number of impacts it makes; thus more electrons will be lost when X is great than when X is small.

While it is known that certain advantages reside in the provision of proportional counter cathodes of high transparency, for example cathodes of copper screen of varying mesh, the size of which may be selected for optimum results for the specific use intended, cathodes of high transparency have heretofore been limited to inclusion in known types of cylindrical proportional counters. One form of the present invention utilizes a pair of cathodes of high transparency in a parallel plate proportional counter, which, due to geometric arrangement of electrodes, may be aptly termed a shallow plane counter, the cathodes being associated with an anode of novel design in a manner to provide a proportional counter of substantial effective area while maintaining a high response ratio throughout the entire area as compared with known counters of substantially smaller effective area.

It is apparent that the ultimate goal in proportional counter design is to provide a counter in which an initial ionizing event occurring at one point between the electrodes produces the same response as a similar ionizing event occurring at any other point therebetween. In the present counter the maximum deviation from the average response, as empirically determined, is in the order of 6 percent, said deviation varying cyclically in respect to an average value, whereas in conventional cylindrical type proportional counters the response is a monotonically decreasing function of the distance from the anode.

It is therefore a primary object of the invention to provide a proportional counter, termed a shallow plane counter, including an assembly of planiform electrodes of novel construction to obtain substantial increase in the effective proportional counting area while retaining uniformity of response inherent in cylindrical counters of small diameter.

A further object of the invention is to provide a proportional counter incorporating the above features which is particularly adapted for laboratory use in the study of proportional counter phenomena.

A still further object is to provide a proportional counter comprising a plurality of planiform electrode assemblies including an anode of novel design, which has particular utility for determination of the characteristics of ionizing particles by the "multiple coincidence" and the "anti-coincidence" methods.

Other objects and advantages of the present invention will be readily apparent to persons skilled in the art upon examination of the description and the drawings and the claims appended thereto.

Figure 1:
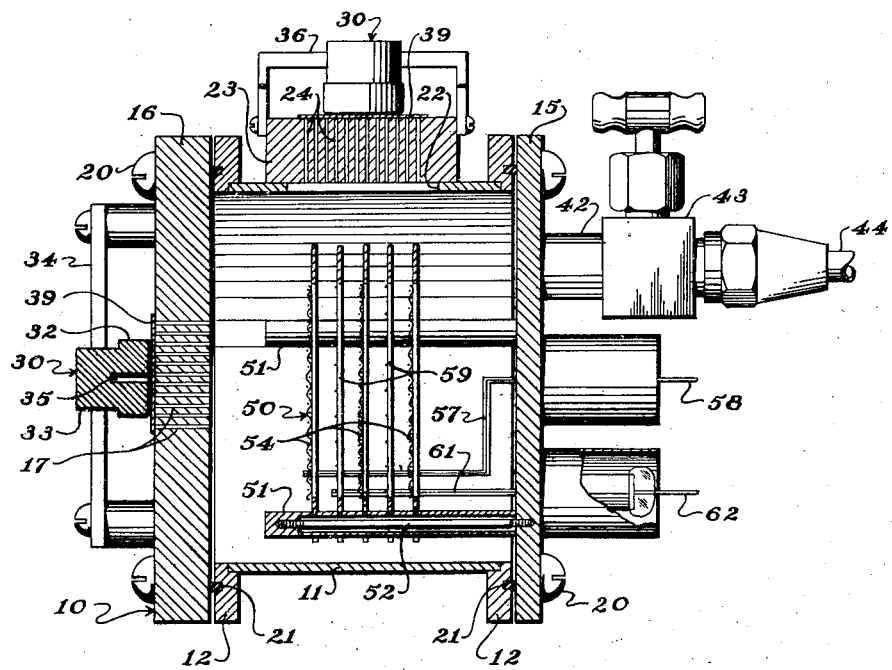
Figure 1 is a vertical section along the axis of a device incorporating the present invention.

Referring to Figure 1 a proportional counter device, generically designated 10, comprises a drum-like housing including a cylindrical center portion 11 provided with marginal flanges 12 which consist of a pair of annular elements in complementary engagement with portion 11 and suitably bonded thereto. A circular plate 15 provides a closure for one end of the central drum portion 11, a circular plate 16, provided with a collimated portion 17, providing a closure for the other end thereof. Closures 15 and 16 are maintained in clamping engagement with flanges 12 by suitable screws 20, annular gaskets 21 being provided to seal the interior of the device from the surrounding atmosphere. Cylinder 11 is provided in the upper wall portion with an aperture 22, plate 23, provided with a collimated portion 24 being suitably mounted in sealing relation to cylinder 11 to provide a closure for aperture 22.

Both plate 16 and plate 23 are of a suitable thickness and material to prevent transmission of ionizing particles to the interior of the device except through the collimating bores of portions 17 and 24, respectively. For the purpose of directing suitable ionizing particles into the device through preselected bores of the respective collimating portions, a pair of source holder devices 30 are provided. Devices 30 may be identical, comprising a cylindrical base portion 32 and a reduced cylindrical mounting portion 33 integral therewith, an axially disposed bore 35, as shown in the cross-sectioned holder adjacent plate 16, opening toward collimated portion 17, being adapted to confine emission from a source disposed therein in a direction normal to the plane of plate 16. Bore 35 is preferably of a diameter to allow alignment with only one bore of the collimated portion, thus confining particle transmission into the device through a single collimator bore. Portion 33 is provided with a transverse slot for slidable disposition on slide bars 34 and 36, suitably mounted to plates 16 and 23, respectively. To prevent gas communication between the atmosphere and the interior of the device through collimated portions 17 and 24, suitable foil-like elements 39, transparent to ionizing particles, are bonded to elements 16 and 23 to provide sealing closures over the outer surfaces of the collimated areas. The holder 30 mounted adjacent area 23 permits introduction of particles in a direction parallel to the plane of the electrodes for studying interaction effect between contiguously disposed electrode assemblies, which effectively constitute individual counters. Gas transfer is effected between the interior of the device and suitable apparatus external thereof through conduit 42 which is provided with a control valve 43 intermediate the device and an associated conduit 44.

Figure 2:
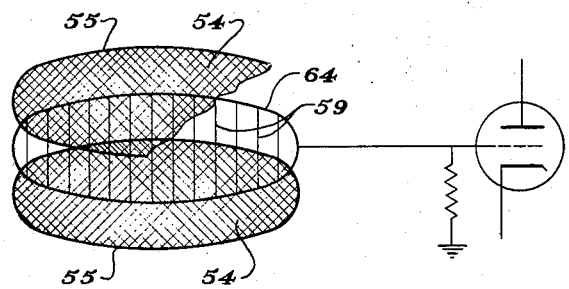
Figure 2 illustrates schematically a preferred type electrode assembly, the anode of which leads to the control element of an electron tube which is representative of the input circuit of an electronic amplifier.

An electrode assembly, generically designated 50, is supported centrally within the cylindrical portion of the device by means of a plurality of elongated electrical insulating supporting elements 51 which find their support in plate 15 by means of internally disposed rods 52 having threaded termini engaging a solid end portion of the elements and plate 15, respectively, as shown. Assembly 50 comprises alternate electrodes 54 which are of planiform configuration and may consist of wire mesh rigidly maintained by suitable marginal rings 55, Figure 2. Electrodes 54 comprise cathodes which are maintained at an equal negative potential by connection, not shown, through a shielded conductor 57 which extends through plate 15 in gas sealing relation thereto to a suitable external terminal 58. Anode electrodes 59 are disposed midway between cathodes 54 in parallel spaced relation thereto and are maintained at a suitable positive potential by connection, not shown, through shielded conductor 61 which leads to terminal 62, similar to terminal 58. Electrodes 59, as best shown in Figure 2, comprise a plurality of wire-like elements in parallel spaced relation comprising a planiform grid, the wires being rigidly strung on a suitable marginal ring 64, Figure 2.

While the device may be operated as a proportional counter without the introduction of a gas other than air therein, it has been found advantageous to introduce a gaseous mixture comprising approximately 97 percent by pressure of argon and 3 percent by pressure of carbon dioxide. The optimum pressure of the gaseous mixture is related to the specific potential difference at which the electrodes are maintained as well as to the particular characteristics of the gas, the configuration of the electrostatic field therebetween, the character of the ionizing particles under study, the information to be obtained during specific use, and to other factors. Detailed discussion of the relation between gaseous characteristics and pressures and the features above enumerated is avoided herein, since the invention may be adequately described without a detailed treatise thereon.

The device above described is particularly adapted for particle range determination by the multiple coincidence or anti-coincidence counting method. When used for this purpose a slight modification of electrode wiring with respect to external connections is required, for example each collecting electrode, or anode, may be provided with an individual external connection similar to the connections illustrated, the specific wiring for use of the device in this manner not being illustrated, it being readily apparent to persons skilled in the art. The device offers obvious advantages over the use of a plurality of individual counters as heretofore known, due to the compactness of electrode structure and the disposition of all electrodes in an identical gaseous mixture which provides in effect a plurality of contiguously disposed shallow plane proportional counters of identical operating characteristics. It has been empirically determined that during use of the device in the above described manner no effective disturbance between individual electrode assemblies occurs due to the contiguous counter assemblies employing a common cathode.

While the use of cathode assemblies of high transparency, such as the screen assemblies above illustrated are preferred, the invention is not so limited, since other types of planiform cathode electrodes may be employed, for example electrodes of aluminum foil which readily pass ionizing particles while preventing the transmission therethrough of ions formed thereby in the adjacent inter-electrode space.

Figure 6:
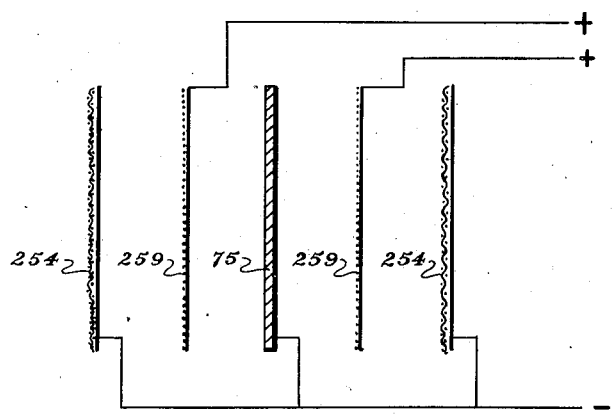
Figure 6 illustrates diagrammatically a modification of the electrode assembly.

An alternate embodiment of the invention is diagrammatically illustrated in Figure 6 in which the electrode assembly comprises a pair of anodes 259, an intermediate cathode 75, and outer cathodes 254. The electrode assembly differs from assembly 50, Figure 1 in respect to the centrally disposed cathode 75 which provides a solid planiform electrode of a material, for example gold or aluminum, and of a preselected thickness to provide an opaque barrier to the transmission of particles below certain energy levels while being effectively transparent to particles above that energy level. With the cathodes leading to a common negative source and the anodes leading to separate detecting circuits, the above modification is effective as a discriminatory proportional counter, for example for the detection of high energy particles when accompanied by low energy particles, as well as numerous other uses and adaptations in nuclear physics research.

Figure 3:
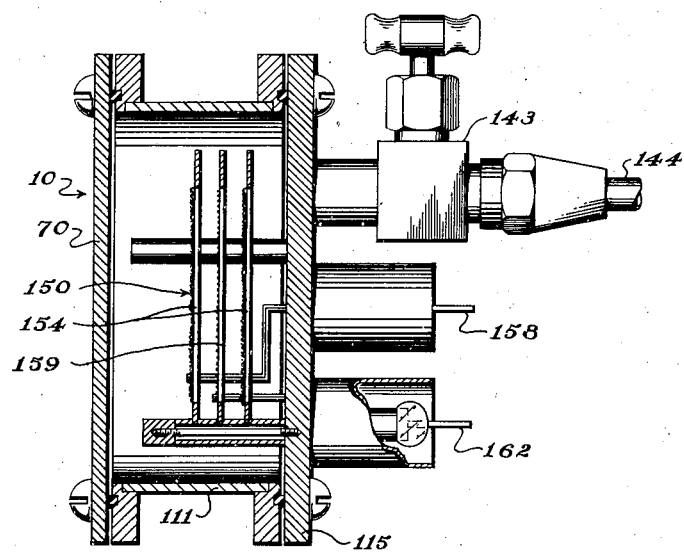
Figure 3 illustrates in longitudinal section a device incorporating another embodiment of the present invention.

Referring to Figure 3, the device shown is particularly adapted for general use rather than for laboratory examination of proportional counter phenomena. Since many of the elements comprising the device correspond to the elements of the device of Figure 1, described above, corresponding elements have been designated by reference numerals numerically one hundred greater than previously described elements. The device of Figure 3 differs from the device of Figure 1 in the following manner. Plates 16 and 23 of Figure 1 and the apparatus mounted thereon are eliminated. A relatively thin plate 70 through which ionizing particles are adapted to pass replaces plate 16, cylinder 111 being unapertured unlike the device of Figure 1. The electrode assembly 150 includes a single pair of cathodes 154 and a single anode 159, the device being adapted for use solely as a proportional counter and not for multiple or anti-coincidence measurements.

Figure 4:
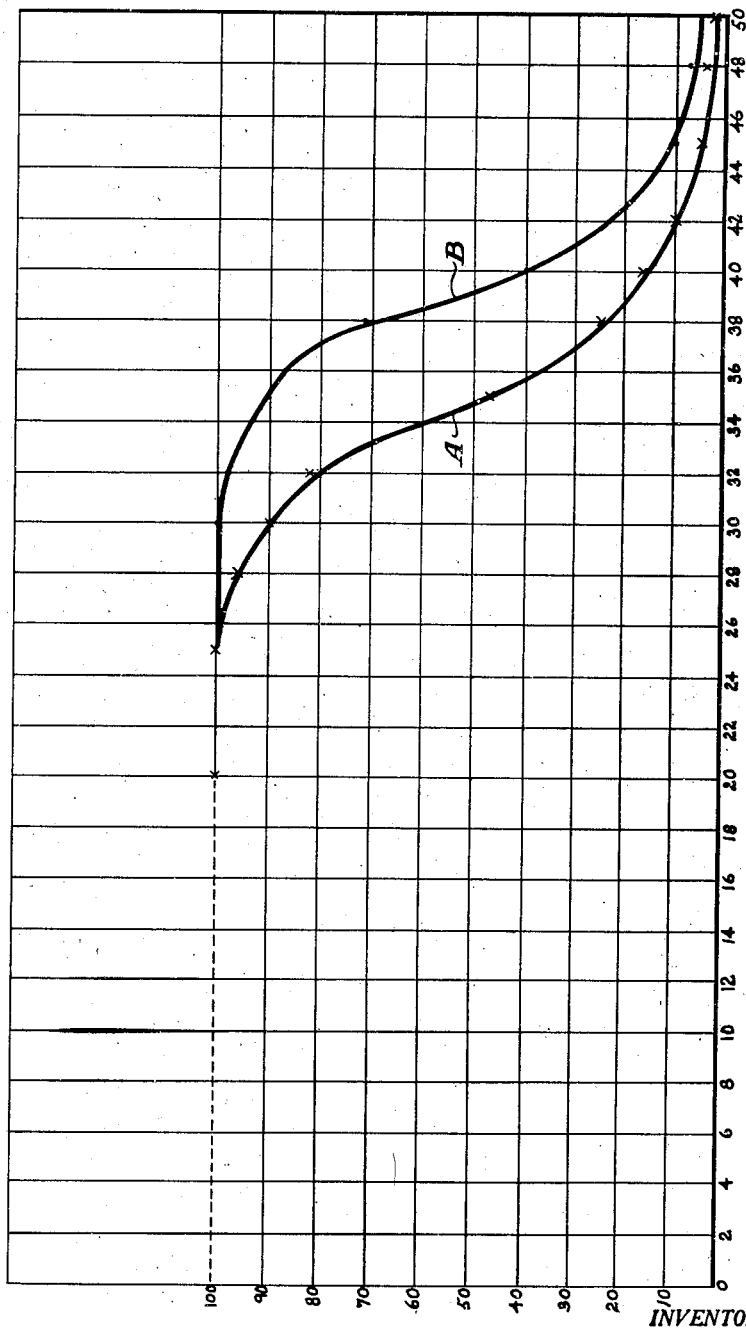
Figure 4 illustrates graphically counting rate as a function of discriminator bias.

Figure 4 illustrates graphically the relative counting rate, plotted as ordinate, as a function of discriminator bias, plotted as abscissa, when a collimated beam of α particles is directed normal to the plane of the electrodes. The data for curve A were obtained by directing the collimated beam midway between adjacent anode wires, for curve B by directing the beam immediately adjacent one of the anode wires. For any position of the beam intermediate the above two, one obtains a curve lying between curves A and B. These curves illustrate the phenomenon mentioned above, that the pulse height observed decreases with increase in the distance of the ionizing event from the anode wire, however, as shown by Figure 4, in the present counter the maximum deviation from the average response is approximately six percent.

Figure 5:
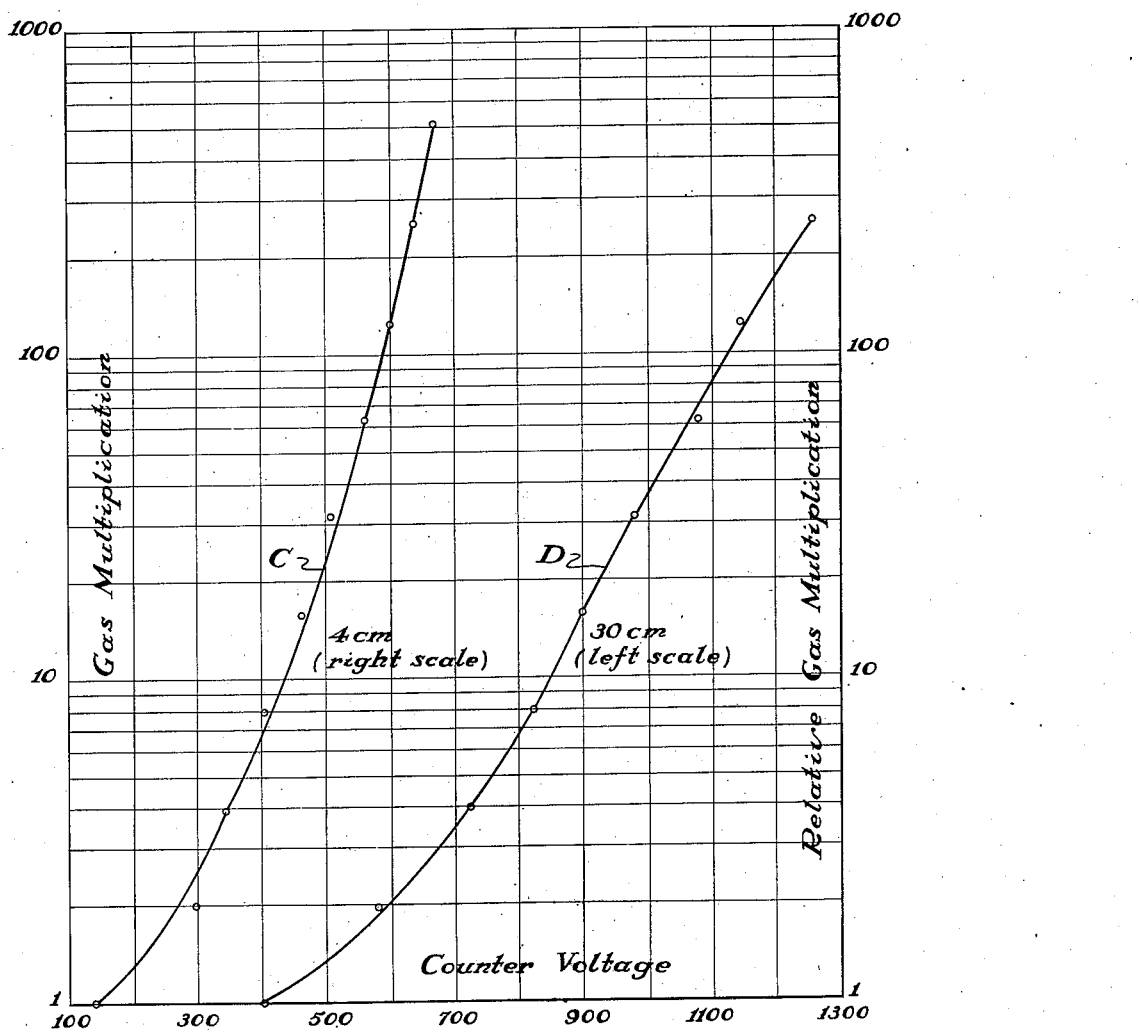
Figure 5 illustrates graphically gas amplification as a function of counter voltage.

Figure 5 illustrates the gas multiplication or amplification as a function of counter voltage for two different pressures of the above mentioned mixture, consisting of 97 percent by pressure of argon and 3 percent by pressure of carbon dioxide. Curve C, empirically obtained with a gas pressure of 4 centimeters of mercury, is read from the right hand scale of the graph. In this case it was impossible to observe the ionization pulses directly, the gas multiplication scale indicating relative values. Curve D is plotted against the left hand scale of the graph, the units of which give the ratio of the pulse observed with multiplication to that observed without multiplication. Curves C and D illustrate the large ranges of counter voltages and resultant gas amplification values over which the counter described above is operative. The slopes of curves C and D indicate that increment in gas multiplication as a function of counter voltage increase is, at all points on the curves, within limits which insure stability of operation of the counter.

Other adaptations and embodiments of the invention will become apparent to persons skilled in the art without departing from the spirit and scope thereof as defined with particularity in the following claims.

I claim:

1. In a shallow plane proportional counter, a housing, a gaseous mixture within said housing consisting of approximately 97 percent argon and 3 percent carbon dioxide, an electrode assembly disposed within said gaseous mixture in said housing in electrically insulated relation thereto, said assembly comprising a pair of generally planiform cathode electrodes in parallel spaced relation, and an anode electrode spaced midway therebetween, said anode electrode consisting of a plurality of wire-like elements, and means maintaining said cathode electrodes at one potential and said anode electrode at a different potential.

2. In a device of the character described, a sealed housing including a generally planiform wall of a thickness to prevent transmission therethrough of ionizing particles of predetermined energy, said wall having an area provided with a plurality of collimating channels extending through said wall in right angularity to the plane of the wall, the outer surface of said collimated area being sealed by a foil-like element adapted to permit transmission of said particle therethrough, an electrode assembly disposed within said housing and comprising a plurality of generally planiform electrodes in mutually spaced parallel relation, said assembly being in parallel spaced relation to said wall in alignment with said collimated area thereof, said electrodes including one of grid like construction maintained at ground potential and an electrode disposed on either side thereof maintained at less than ground potential, and means for selectively introducing ionizing particles through preselected channels in said collimated wall area.

3. In a shallow plane proportional counter, a housing including a portion opaque to ionizing particle transmission provided with a plurality of closely spaced channels extending therethrough to constitute a collimating area, a gas sealing element transparent to ionizing particles bonded to the outersurface of said area, means for maintaining a gaseous mixture within said housing at a preselected pressure, an electrode assembly disposed within said housing in electrically insulated relation thereto, said assembly comprising a pair of generally planiform cathode electrodes in parallel spaced relation and an anode electrode spaced midway therebetween, said anode electrode consisting of a plurality of wire-like elements, means maintaining said cathode electrodes at one potential and said anode electrode at a different potential, and means for selectively introducing ionizing particles into said chamber in a direction normal to the plane of said electrodes, said means comprising a holder for a source of ionizing particles mounted for movement across the outer surface of said sealing element, said holder being provided with a channel for disposition therein of said source, said channel opening in a manner to confine emission from said source toward the collimated channels, the channel of said holder being of smaller cross sectional area than the area intervening between the channels of the collimated housing portion, whereby to confine alignment of the channel of the holder with one of the collimating channels to permit particle emission from said source through said aligned channels into said housing in right angularity to the plane of said electrode assembly.

4. In a device of the character described, a sealed housing including a generally planiform wall of a thickness to prevent transmission therethrough of ionizing particles of predetermined energy, said wall having an area provided with a plurality of collimating channels extending through said wall in right angularity to the plane of the wall, the outer surface of said collimated area being sealed by a foil-like element adapted to permit transmission of said particles therethrough, an electrode assembly disposed within said housing and comprising a plurality of generally planiform electrodes in mutually spaced parallel relation, said assembly being in parallel spaced relation to said wall in alignment with said collimated area thereof, said electrodes including one of grid like construction and an electrode disposed on either side thereof, and means for selectively introducing ionizing particles through preselected channels in said collimated wall area.

ROBERT W. THOMPSON.

REFERENCES CITED

The following references are of record in the file of this patent:

UNITED STATES PATENTS

| Number | Name | Date |
| --- | --- | --- |
| 2,197,453 | Hassler | Apr. 16, 1940 |
| 2,349,753 | Pontecorvo | May 23, 1944 |
| 2,397,073 | Hare et al. | Mar. 19, 1946 |

FOREIGN PATENTS

| Number | Country | Date |
| --- | --- | --- |
| 234,517 | Germany | May 13, 1911 |